No. 622,110. Patented Mar. 28, 1899.
J. C. BOWSHER.
HORSE POWER.
(Application filed Sept. 8, 1898.)
(No Model.)

WITNESSES
INVENTOR
Jay C. Bowsher
By Alexander & Dowell
Attorneys

United States Patent Office.

JAY C. BOWSHER, OF SOUTH BEND, INDIANA.

HORSE-POWER.

SPECIFICATION forming part of Letters Patent No. 622,110, dated March 28, 1899.

Application filed September 8, 1898. Serial No. 690,500. (No model.)

*To all whom it may concern:*

Be it known that I, JAY C. BOWSHER, of South Bend, in the county of St Joseph and State of Indiana, have invented certain new and useful Improvements in Horse-Powers; and I hereby declare that the following is a full, clear, and exact description thereof, reference being had to the accompanying drawings, which form part of this specification.

This invention is an improvement in horse-powers for feed-mills, &c.

Heretofore a triangular sweep has been attached to the rotary or grinding portion of the mill, and to the outer end of this sweep it is customary to attach a doubletree, to which the horses are hitched side by side, one at each extremity of the doubletree. Therefore one horse will walk on a smaller radius than the other, and consequently never has an opportunity to pull to advantage, owing to the chafing with the other horse and the cramped position in which he has to work.

My improvement consists in using an auxiliary sweep or lever which is pivoted to the base of the ordinary sweep and which can swing backward and forward. The second horse is hitched to the outer end of this lever, which end is connected by a link or rod to the doubletree on the sweep at a point intermediate the inner end of the doubletree and the pivoted center of the same. By this construction the full power of the two horses is applied to the frame of the sweep and each horse walks free from the other in the same path and having the same leverage, and as the lever can swing there is an opportunity for a compensating or equalizing of the draft on the horses as the load varies.

Figure 1:
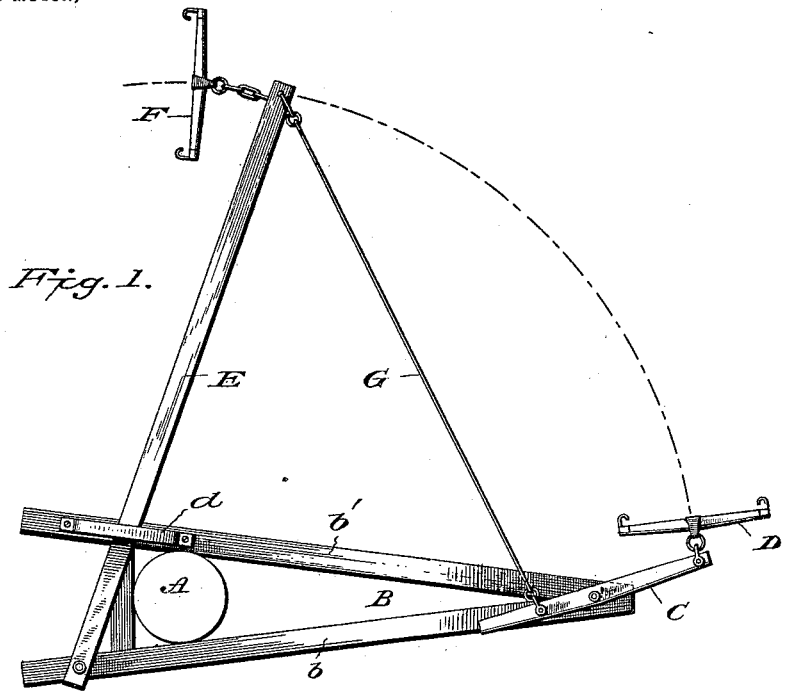
Figure 2:
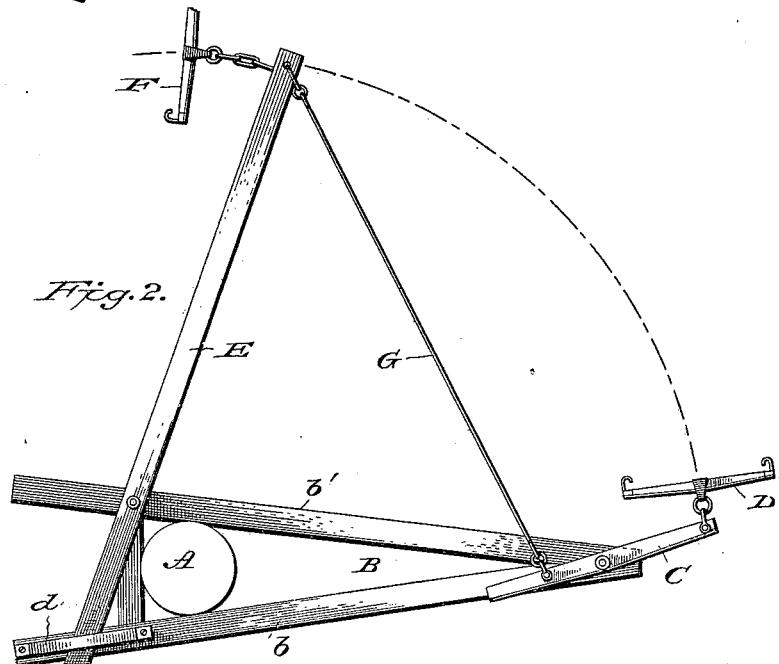

In the accompanying drawings, Figure 1 is a plan view of a horse-power sweep, illustrating the invention. Fig. 2 is a similar view illustrating a slight modification thereof.

A designates the rotary portion of a grinding-mill or other device which is to be rotated by horse-power.

B designates a triangular sweep of usual construction made fast to the part A. To the outer extremity of this sweep is pivoted the doubletree C, as usual, to the outer end of which is attached the singletree D. To the base of the sweep (at the side of the part A opposite the doubletree C) is pivoted one end of a lever E, which, as shown in Fig. 1, may be pivoted to the right-hand beam $b$ of the sweep, or, as shown in Fig. 2, may be pivoted to the left-hand beam $b'$. This beam is guided and limited in its swinging movement by a loop $d$, attached to the beam opposite the pivot of the lever—*i. e.*, the beam $b'$ in Fig. 1 and the beam $b$ in Fig. 2. To the outer end of this lever E is attached a singletree F, which is equally distant from the part A as the tree D, so that the horses attached to the said singletrees will walk in the same path.

The outer end of lever E is connected by a link or rod G to the doubletree C at a point about midway between the center of the doubletree and the inner extremity thereof. In thus coupling the lever and the doubletree together I produce in a measure an equalizing effect, so that the draft upon the two horses attached to the singletrees F and D, respectively, will be substantially equalized; but this long lever not only enables the two horses to walk in the same path free from interference with each other, but it further exerts a direct influence on the rotation of the part A, as one component of the force exerted by the horse attached to the singletree F is transmitted through the lever E to the base of the sweep, tending to force the mill around.

The foregoing device is very simple in construction and is especially adapted where two draft-animals are to be employed.

Having thus described my invention, what I therefore claim as new, and desire to secure by Letters Patent thereon, is—

1. In a horse-power the combination of a sweep attached to the part to be rotated, a tree attached to the outer end of said sweep, a lever pivoted to the base of said sweep at the side of the part to be rotated opposite the tree, a tree attached to the outer end of said lever, and yielding connections between the outer ends of said lever and sweep, substantially as described.

2. In a horse-power the combination of a sweep attached to the part to be rotated, a singletree attached to a pivoted support or doubletree on the outer end of said sweep, a lever pivoted to the base of said sweep at the side of the part to be rotated opposite the tree, a singletree attached to the outer end of said lever, and yielding connections between the outer end of said lever and the said support on the sweep, substantially as described.

3. The combination of the sweep, the doubletree pivoted at the outer end of the sweep, the lever pivoted to the base of the sweep at the side of the part to be rotated opposite the tree, a rod connecting the outer end of said lever to the inner portion of the doubletree and singletrees attached to the outer end of said lever, and to the outer end of said doubletree, for the purpose and substantially as described.

4. In a horse-power grinding-mill, the combination of a sweep attached to the rotating part, a doubletree attached to one end of the sweep, and a lever pivoted to the base of the sweep at the side of the rotating part opposite the tree, a guide-strap for said lever attached to the base of the sweep, a rod attached to the outer end of said lever and to the doubletree at a point intermediate its center and the part to be rotated, and singletrees respectively attached to the outer end of said lever, and to the outer end of said doubletree, for the purpose and substantially as described.

In testimony that I claim the foregoing as my own I affix my signature in presence of two witnesses.

JAY C. BOWSHER.

In presence of—
JAMES DUSHANE,
EDWARD F. DUBAIL.